United States Patent [19]

Kresge

[11] Patent Number: 4,809,124
[45] Date of Patent: Feb. 28, 1989

[54] HIGH-ENERGY LOW-VOLTAGE SURGE ARRESTER

[75] Inventor: James S. Kresge, Pittsfield, Mass.

[73] Assignee: General Electric Company, King of Prussia, Pa.

[21] Appl. No.: 172,586

[22] Filed: Mar. 24, 1988

[51] Int. Cl.$^4$ .............................................. H02H 9/04
[52] U.S. Cl. ..................................... 361/58; 361/111; 361/127; 379/412
[58] Field of Search ..................... 361/56, 58, 91, 110, 361/111, 126, 127, 117, 188, 119; 338/21; 379/412

[56] References Cited

U.S. PATENT DOCUMENTS 3,777,219 12/1973 Winters .............................. 317/61.5
4,600,960 7/1986 Clark ..................................... 361/56

OTHER PUBLICATIONS

Description and Sketches of an Arrester Delivered by General Electric Co. to a Purchaser in Jan., 1987.

Primary Examiner—A. D. Pellinen
Assistant Examiner—Todd F. DeBoer
Attorney, Agent, or Firm—Henry J. Policinski; William Freedman

[57] ABSTRACT

This surge arrester is for protecting against high-energy and very fast surges and comprises first and second electrodes and a metal oxide varistor (MOV) disk between the electrodes. Each electrode has a central region and, at generally diametrically-opposed sides thereof, a source terminal and a load terminal. The terminals of each electrode are connected in the protected circuit in such a manner that load current in each of the conductors of the protected circuit flows through the electrode via a path that extends in series through the source terminal, the central region, and the load terminal. The source terminals of the two electrodes are generally aligned with each other about the periphery of the MOV disk, and the load terminals are also generally aligned with each other about the periphery of the disk. When the MOV disk is rendered conductive by a surge entering through the source terminal of one electrode, the arrester acts as a low-pass L/R filter that substantially reduces the voltage appearing at the load terminal of the arrester compared to that entering through the source terminal.

10 Claims, 2 Drawing Sheets

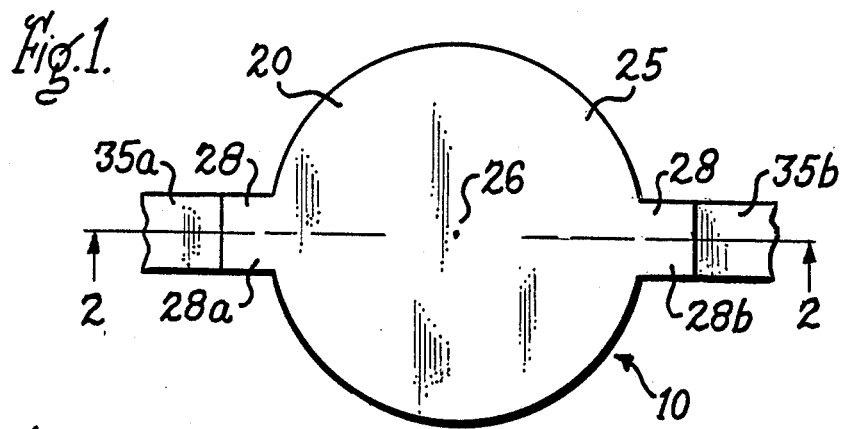
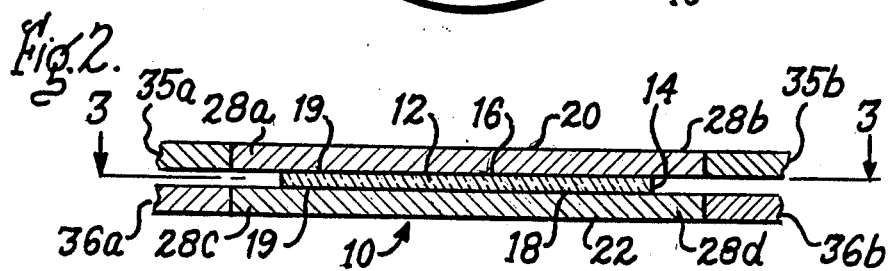
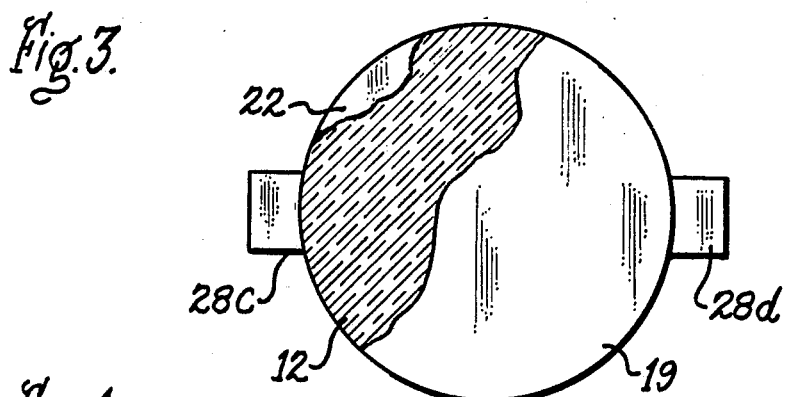
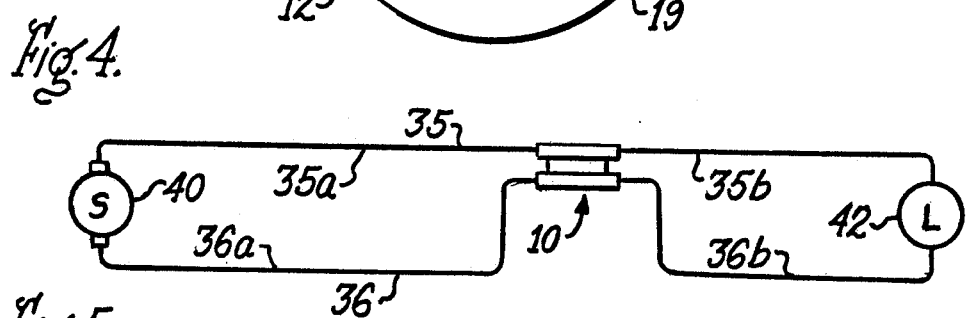
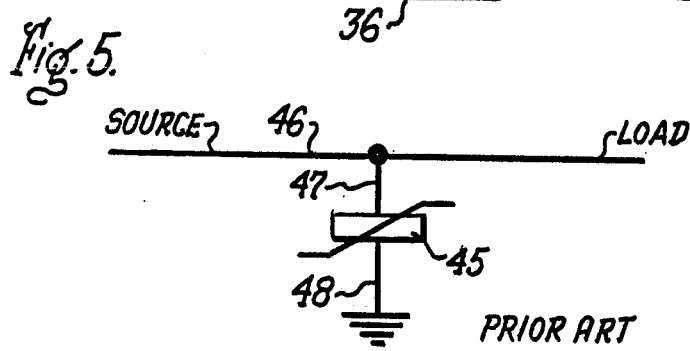

HIGH-ENERGY LOW-VOLTAGE SURGE ARRESTER

BACKGROUND

This invention relates to a high-energy, low-voltage surge arrester for protecting electric circuit components against surges that are capable of rising at extremely high rates to thousands of amperes. The invention is particularly concerned with a surge arrester for use in low-voltage circuits rates at 25 volts or higher and for protection against surges having an energy content of 100's of watt-seconds or more.

There are now available high quality metal oxide varistor (MOV) disks that are sufficiently thin and sufficiently large in cross section as to provide effective high energy surge protection for low-voltage power circuits. For example, applicant's assignee has produced MOV disks of up to 3 inches in diameter and as thin as 0.03 inches. A typical disk for applicaton on a circuit rated at 120 volts normal (132 volts maximum) would be 3 inches in diameter and 0.05 inches thick. Such a disk exhibits a break-over voltage of about 350 volts crest at 10 KA on a wave of $8 \times 20$ $\mu$Sec and is capable of absorbing 1 kJ of energy without damage.

The term "disk" as used herein is intended to comprehend within its meaning any structure of plate-like form irrespective of its peripheral configuration, whether circular, rectangular, or otherwise. The term "disk structure" as used herein is intended to comprehend one or more disks.

One application for an MOV disk of the type referred to hereinabove is in the military for protection of various installations against nuclear electromagnetic pulse (NEMP) surges. It is known that such pulses produce very fast rising current discharges requiring response times from a protective device on the order of 10 to 100 nanoseconds (nSec). In other applications such as the protection of circuits feeding sensitive equipment incorporating solid state devices and microprocessors, the response of the protective device to nanosecond phenomena may also be of importance. Examples of such equipment are medical equipment such as CAT scanners and MR imaging machines, computers, and microprocessor based process equipment. At the present time, there are many protective devices being marketed which are advertised as having nanosecond response, but these claims are often greatly exaggerated.

OBJECTS

An object of my invention is to provide a surge arrester of the type comprising a thin disk of MOV material and electrodes at opposite ends of the disk that is capable of protecting against very fast current surges capable, for example, of rising to 10 kA crest values in some 10's of nanoseconds.

Another object is to provide means for connecting an arrester of the above type in a power circuit in such a way that there are substantially no leads between the power circuit and the arrester and therefore substantially no lead inductances to interfere with the arrester's limiting the voltage on the load side of the arrester to the desired low level.

In the type of arrester I am concerned with, there are a thin disk of MOV material and flat electrodes of plate form at opposite ends of the MOV disk. Each of the electrodes comprises a source terminal and a load terminal located so that under normal circuit-conditions, when the MOV disk is not conductive, load current flows through each electrode between these terminals by a path extending generally parallel to the end surfaces of the MOV disk.

Another object is to construct an arrester of this form in such a manner that when a fast-rising current surge appears at its source terminals and renders the MOV disk conductive, the arrester acts as an effective L/R filter that significantly reduces the voltage at its load terminals in comparison to that present at its source terminals.

SUMMARY

In accordance with one form of my invention, each of the above-described electrodes of plate form has its two terminals located at the outer periphery of the electrode in positions that are generally diametrically-opposed with respect to a central region of the electrode. One terminal of each electrode constitutes a source terminal and the other a load terminal. The two source terminals of the arrester are substantially aligned with each other, and the two load terminals are also substantially aligned with each other. The inductance of the two electrodes between the source terminal and the load terminal of each electrode coacts with the resistance of the MOV disk when the disk is rendered conductive by a surge appearing at the source terminals to form a low-pass L/R filter that substantially reduces the voltage appearing at the load terminals in comparison to that produced by the surge at the source terminals.

At least one of the electrodes is sufficiently narrow transversely of the normal current path through the electrode that the electrode offers no conductive bypass between the source terminal and the load terminal thereof that is located outside the periphery of the MOV disk in the region of the electrode.

BRIEF DESCRIPTION OF DRAWINGS

For a better understanding of the invention, reference may be had to the following detailed description, taken in connection with the accompanying drawings, wherein:

FIG. 1 is a plan view of a surge arrester embodying one form of the invention.

FIG. 2 is a sectional view taken along the line 2—2 of FIG. 1.

FIG. 3 is a sectional view along the line 3—3 of FIG. 2.

FIG. 4 is a schematic showing of a low-voltage power circuit including the surge arrester of FIGS. 1-3.

FIG. 5 is a schematic showing of a surge arrester connected in a power circuit in a manner conventional in the prior art.

DETAILED DESCRIPTION OF PREFERRED EMBODIMENT

Figure 6:
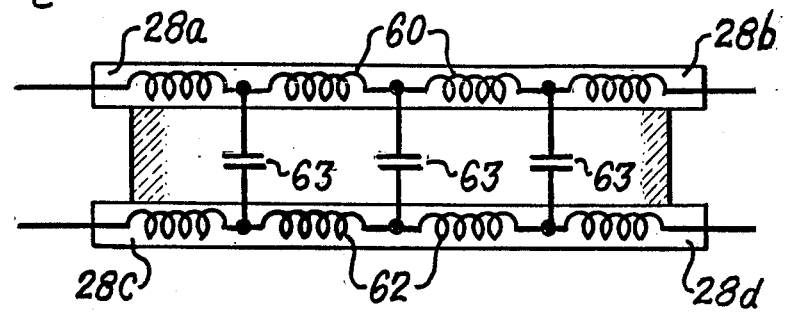
FIG. 6 depicts the equivalent circuit for my surge arrester under normal circuit conditions when the MOV disk is substantially non-conductive.

Referring first to FIGS. 1 and 2, the surge arrester 10 depicted therein comprises a thin disk 12 of metal oxide varistor material having a circular periphery 14 and two planar external surfaces 16 and 18 at its opposite ends. Each of the external end surfaces is coated with a thin layer 19 of highly conductive metal, such as aluminum or silver, applied by a suitable metallizing process. Brazed to these metallized surfaces are two electrodes 20 and 22 of highly conductive metal such as copper. In a modified form of the invention (not shown), the electrodes 20 and 22, instead of being brazed to the metallized surfaces 16 and 18, are clamped against the metallized surfaces by insulating bolts extending between the two electrodes. Where the currents involved are very high, the clamped construction is preferred in order to maintain the arrester's integrity against the high magnetic forces that are developed by such currents.

In the illustrated embodiment, each electrode 20 and 22 is in the form of a flat plate comprising a body 25 of generally circular cross-section and two terminal lugs 28 projecting radially from the electrode body 25 on diametrically-opposed sides of the central region 26 of the body 25. In the illustrated embodiment, the lugs 28 are of the same thickness as the body 25 of the associated electrode and are disposed in the same plane as the body 25.

A typical circuit application for my surge arrester is a circuit having a rated voltage of 277 volts rms. In one such application, I use an MOV disk having a thickness of 0.115 inches and a diameter of 3 inches. In this embodiment, the electrodes are ¼ inch in thickness. The electrode bodies 25 are of the same diameter, and the circular peripheries of these bodies are disposed in alignment with the circular periphery of the MOV disk. The metal oxide varistor material consists essentially of zinc oxide and a small percentage of other metal oxide additives. My U.S. Pat. No. 4,243,622, assigned to the assignee of the present invention, discloses a typical zinc-oxide based material that is suitable for this application.

Referring to the schematic showing of FIG. 4, the surge arrester 10 is shown connected in a power circuit comprising two spaced-apart conductors 35 and 36 that interconnect a source 40 and a load 42. Conductor 35 extends between the upper terminal of the source 40 and the upper terminal of the load 42, whereas conductor 36 extends between the lower terminal of load 42 and the lower terminal of source 40. The surge arrester 10 is, in effect, connected across the conductors 35 and 36 and in parallel with the load 42. Conductor 35 comprises a first portion 35a connected between the source 40 and the surge arrester 10 and a second portion 35b connected between the load 42 and the surge arrester 10. Conductor 36 comprises a first portion 36a connected between the source 40 and the arrester 10 and a second portion 36b connected between the load 42 and the surge arrester 10.

Referring to FIG. 2, conductor 35a is shown connected to the upper left-hand terminal lug 28 of the arrester, and conductor 35b is shown connected to the upper right-hand terminal lug 28. These terminal lugs are respectively designated 28a and 28b, lug 28a being referred to herein as a source terminal of the arrester and lug 28b as a load terminal. Conductor 36a is connected to the lower left-hand terminal lug 28 of the arrester, and conductor 36b is shown connected to the lower right-hand terminal lug 28. These lower terminal lugs are respectively designated 28c and 28d, lug 28c being referred to herein as a source terminal and lug 28d as a load terminal.

In the illustrated embodiment, the conductors 35a, 35b, 36a, 36b, in the region adjacent the arrester 10, are shown as copper bars having their ends joined by brazing to the outer ends of the terminal lugs 28. It is to be understood that other suitable conventional connecting means can alternatively be used for making these connections.

It is common practice to connect a surge arrester in a tee connection from a line to ground, as shown in the diagrammatic illustration of FIG. 5, where the arrester is depicted at 45, the line at 46, and connecting leads at 47, 48. In such a connection scheme, the inductance of the two leads represents an appreciable impedance to fast rising current waves, and this impedance adds to that of the arrester appreciably. As an example, the inductance of a lead is in the order 0.0025 $\mu$h for a lead of only 0.1 inch length. For an impressed current wave of 10 kA rising to crest in 10 nSec, the voltage drop across the 0.1 inches of lead will be:

$$L(di/dt) = 0.0025 \times 10^{-6} \times 10^4 / 10 \times 10^{-9} = 2500 \text{ volts}$$

Assuming the arrester is expected to protect to less than about 1,000 volts (e.g., for a 277 volts circuit), it will be apparent that even 0.1 inch of lead length is unacceptable for the fast rising current surges referred to above.

I have been able to achieve an almost zero lead length in my surge arrester because of the special way in which my electrodes 20 and 22 are connected. In this respect, note that the upper electrode 20 is connected in series with the upper conductor 35, and the lower electrode 22 is connected in series with the lower conductor 36. Under normal circuit conditions, current entering the upper electrode from the source through terminal 28a flows across the electrode and exits through the opposite terminal 28b to the load. Similarly, return current from the load entering the lower electrode through terminal 28d flows across the lower electrode and exits through the opposite terminal 28c back to the source. These normal current paths across the two electrodes are in extremely close proximity to the metal oxide varistor disk 12. When the MOV disk 12 is rendered conductive by a surge entering one of the terminals, e.g., source terminal 28a, current is diverted from the above described path through the electrode 20 into the MOV disk and exits through terminal 28c. There is virtually zero lead length present in the path between the electrodes 20 and 22 and therefore extremely low inductance across which undesired voltage would build up.

A feature which contributes to the virtual absence of lead length in my arrester is the fact that the terminals 28 of each electrode are located in the same plane as the body 25 of the associated electrode. Thus, current is able to enter the body 25 from the load terminal 28a, for example, via a straight line path having no jogs or the like therein that would act like the leads of FIG. 5 to introduce undesired inductance at this point.

FIG. 6 illustrates the equivalent circuit through the arrester under normal circuit conditions. The inductance presented by the upper electrodes to current following the normal path therethrough is depicted at 60 and that presented by the lower electrode is depicted at 62. The MOV disk has a capacitance that is represented by the parallel capacitors 63 connected between the inductances at points spaced along the length of the inductances. Under normal circuit conditions, the resistance of the MOV disk is so high that virtually no resistive current flows therethrough, and thus the path through the MOV disk is illustrated as purely capacitive.

Figure 7:
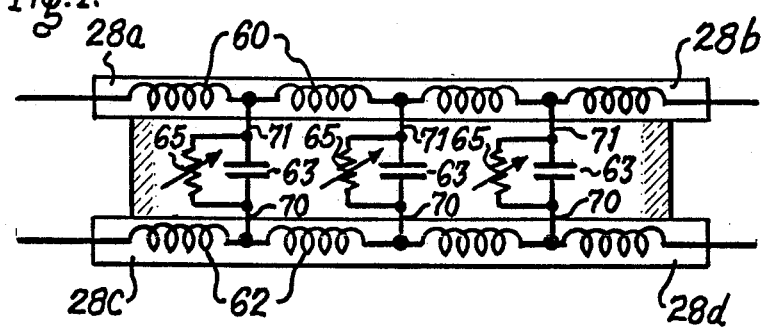
FIG. 7 depicts the equivalent circuit for my surge arrester during the period when the MOV disk has been rendered conductive by a surge appearing across its source terminals.

FIG. 7 illustrates the equivalent circuit through the arrester when the MOV disk 12 has been rendered conductive by a surge. This equivalent circuit is the same as that of FIG. 6 except that the now-conductive MOV disk 12 appears as a plurality of non-linear resistors 65 respectively connected in parallel with the capacitors 63 and with each other. Now consider that happens when a fast impulse current wave is injected into the source terminal 28a of FIG. 6. The surge impendance Z of this network equals $\sqrt{L/C}$, where L is its effective inductance and C is its effective capacitance. For the dimensions previously discussed in connection with FIGS. 1 and 2, the Z for this network is about 1.6 ohms and the break-over level of the MOV disk is about 800 volts. Initially, the non-linear resistors 65 are not in the picture, and the injected current wave encounters the surge impedance of the network. A voltage wave is developed at the input or source terminal 28a which is of a magnitude V=IZ, where I is the instantaneous current and Z is the surge impedance of the network. This voltage (and accompanying current) wave passes down the line (or electrode) 20 and appears at the load terminal 28b several (e.g., 7) nanoseconds later. However, when the surge current into the line reaches about 500 amps, the input voltage approaches the 800 volt break-over level of the MOV disk 12 and the non-linear resistor elements 65 come into play. As the voltage continues to rise, the MOV disk conducts very heavily and the resistance of the non-linear resistive elements 65 becomes very low. The current in the non-linear resistors 65 must flow through the inductors near the source terminal 28, causing a high voltage gradient along the conductor 20 at the source terminal of the network. Another way of looking at it is that at an injected current below about 500 amps, we have a simple LC line with a travel time of about 7 nSec, and the source terminal voltage (around 800 V) appears at the load terminal 7 nSec later and essentially undiminished. When the injected current exceeds the 500 amp level, the MOV disk 12 conducts heavily and the dominant circuit elements become the inductance L and the resistance R. The L/R time constant is now very long compared to 7 nSec, and the high voltage at the source terminal 28a cannot travel through to the load. In other words, for fast rising high currents the device acts as a L/R low-pass filter effectively shielding the load side from the very fast high voltage spike existing at the source terminal.

When a current surge entering through the source terminal 28a of FIG. 7 causes the MOV disk to break-over, or become highly conductive, as described above, the current path through the arrester extends between the upper source terminal 28a and the lower source terminal 28c via the above-described L-R-C network. The above discussion of the L/R filtering action assumes that the upper terminal 28a and the lower terminal 28c are substantially aligned with each other as viewed in FIG. 1. If they are appreciably out of alignment with each other, e.g., by 90 degrees, then the current entering through terminal 28a and flowing through the MOV disk 12 will be forced to work its way across the upper and/or lower electrode in order to exit through the lower terminal 28c. This will, in effect, introduce inductance at points 70 and 71 in the equivalent circuit of FIG. 7. Such added inductance will detract from the highly advantageous filtering action described above and will thus cause more of the input voltage to appear at the load terminal 28b.

It is also advantageous that the source terminal and the load terminal of each electrode (e.g., 28a and 28b of electrode 20) be generally diametrically-opposed to each other with respect to the central region of the electrode. In a circular electrode configuration, such as shown in FIG. 1, this relationship provides a straight-line path of maximum length between the two terminals and also tends to maximize the value of the inductances 60 and 62 of FIG. 7 as a result of the maximum length path. As a result, the time required for a voltage wave to travel between input terminal 28a and output terminal 28b is increased and the attenuating effect of the inductance on the voltage wave is increased.

My computer studies of the circuits of FIGS. 6 and 7 indicate that for the above-described filtering action to be effective, the length of the current path between the two terminals of each electrode should be at least three times, and preferably much more than three times, the thickness of the MOV disk structure 12. For example, in the above-described preferred embodiment of FIGS. 1–3, this ratio is about 26.

Another significant feature of my arrester is that the electrodes 20 and 22 are of no greater diameter than the MOV disk 12. The importance of this feature should be apparent from the following discussion.

According to classical transmission line theory, where there is a non-magnetic media between the two parallel conductors of a transmission line, the propogation velocity along the line is equal to:

$$\sqrt{C/E}$$

where C is the velocity of light and E is the dielectric constant of the material between the two conductors. Where there is air between the two conductors (the dielectric constant of which is 1), the propogation velocity of the wave, according to the above equation, is equal to the speed of light. But where there is MOV material between the conductors, the propogation velocity is much lower since the dielectric constant of the MOV material is typically about 800. This would result in a propogation velocity of 35.4 ft/μSec where the MOV material is present between the conductors, as compared to 1000 ft/μSec where air is present.

Returning now to the arrester 10 itself, if the electrodes 20 and 22 had a substantially larger diameter than the disk 12 of MOV material, there, in effect, would be present a parallel lossless transmission line between the terminals 28a and 28b in a region surrounding the MOV disk. Those outer parts of the electrodes that did not have MOV material between them would be separated only by an air media, and a fast rising voltage wave could pass through said outer electrode parts and between the terminals 28a and 28b at a speed-of-light velocity. The outer electrode parts would, in effect, form a bypass with respect to the slow lossy path across the electrode portions that are separated by MOV material. As a result, fast rising high voltage waves appearing at source terminal 28a would be able to travel on parallel lines to the load terminal without benefit of the desired effective filtering action that I have.

It will be apparent from the discussion of the immediately-preceding two paragraphs that the lossless bypass described therein will be absent if only one of the two electrodes is restricted to a diameter of no greater than that of the adjacent MOV disk. Accordingly, my invention in its broader aspects is intended to comprehend a construction in which only one of the electrodes has its diameter restricted to a value no greater than that of the adjacent MOV disk.

Figure 8:
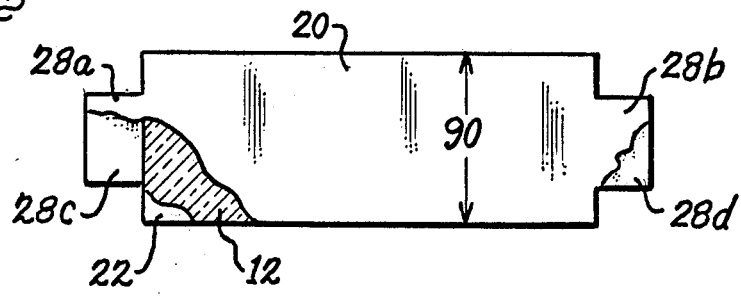
FIG. 8 is a plan view partly in section showing a modified embodiment of the invention.

Although I have described hereinabove an embodiment of the invention that includes an MOV disk of circular peripheral configuration and electrodes of generally circular peripheral configuration, the invention is not limited to a device having components of such configurations. The disk and the electrodes, for example, can be of a rectangular configuration as shown in FIG. 8. In this embodiment, the upper electrode 20 and the lower electrode 22 are flat rectangular plates of identical size and shape and are located at opposite sides of a rectangular MOV disk 12. Each electrode includes terminal lugs at diametrically opposite sides of its central region. The terminal lugs of electrode 20 are designated 28a and 28b, and the terminal lugs of electrode 22 are designated 28c and 28d.

The source terminals 28a and 28c of FIG. 8 are aligned, as indicated in the broken-away portion of FIG. 8, and the load terminals 28b and 28d are also aligned. The electrodes 20 and 22 of FIG. 8 have a width 90 no greater than that of the MOV disk 12, and, as a result, there is no low loss bypass extending between the source and load terminals around the lossy path extending between these terminals where the MOV material is present. As explained in connection with FIGS. 1–7, this precludes fast-rising high voltage waves from passing between the source and load terminals without benefit of the desired effective attenuating and filtering action that results from forcing these waves to follow a lossy path between the terminals.

A more general way of describing this latter feature is that at least one of the electrodes is sufficiently narrow transversely of the normal current path therethrough (i.e., along the width dimension 90 of FIG. 8) that the electrode provides no conductive bypass between the source terminal and the load terminal of the electrode that is located outside the periphery of the MOV disk in the region of said electrode.

Figure 9:
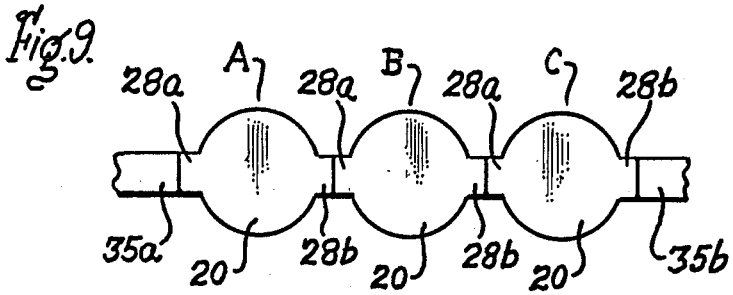
FIG. 9 is a plan view of a further embodiment.

To increase the energy-handling capacity of a surge arrester of the type hereinabove described, a plurality of such arresters can be connected in parallel along the length of the conductors 35 and 36 of FI. 4. An arrester constructed in this manner is illustrated in the plan view of FIG. 9. In this embodiment, three devices, A, B and C, each substantially identical to that of FIGS. 1–3, are located side-by-side. The upper load terminal 28b of the first device A is connected to the upper source terminal 28a of the next device B, and the lower load terminal 28d of the first device is likewise connected to the lower source terminal 28c of the next device. The second and third devices B and C are connected together in the same way. The length of the current path through this arrester is the distance between the source terminal 28a of device A and the load terminal 28b of the device C.

While I have shown and described particular embodiments of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. A surge arrester for protecting against high energy and very fast surges imposed upon a line comprising two conductors, each connected between a source and a load, the surges being capable of rising to thousands of amperes in less than 100 nanoseconds, said surge arrester comprising:
   (a) a first conductive electrode for connection in series with one of said conductors between said source and said load,
   (b) a second conductive electrode for connection in series with the other of said conductors between said source and said load,
   (c) metal oxide varistor disk structure having a thickness of several tenths of an inch or less and external surfaces at opposite ends of its thickness,
   (d) thin metallic coatings respectively coating said external surfaces,
   (e) means for mounting said metal oxide varistor disk structure between said two electrodes with one of said electrodes contacting one of said metallic coatings and the other electrode contacting the other of said metallic coatings, and further characterized by:
   (f) said first electrode having a central region and, at generally diametrically-opposed sides of said central region, a source terminal and a load terminal for connection to said one conductor in such a manner that a load current in said one conductor normally flowing between said source and said load flows through said first electrode via a path that extends in series through said source terminal, said central region, and said load terminal,
   (g) said second electrode having a central region and, at generally diametrically-opposed sides of said central region, a source terminal and a load terminal for connection to said other conductor in such a manner that said load current in returning through said other conductor normally flows between said load and said source through said second electrode via a path that extends in series through said load terminal, said central region, and said source terminal,
   (h) the source terminals of said two electrodes being generally aligned with each other about the periphery of said disk structure,
   (i) the distance between the source terminal and the load terminal of each electrode being at least three times the thickness of said disk structure,
   (j) the inductance of said two electrodes between the source and load terminals of each electrode coacting with the resistance of said disk structure when the disk structure is rendered conductive by a current surge entering through the source terminal of one electrode to form a low-pass L/R filter that substantially reduces the voltage appearing at the load terminal of said one electrode in comparison to that appearing at the source terminal during passage of said surge,
   (k) at least one of said electrodes being sufficiently narrow transversely of the normal current path therethrough that the electrode provides no conductive bypass between the source terminal and the load terminal thereof that is located outside the periphery of said varistor disk structure in the region of said electrode, and (l) the effective length of any lead between each line conductor and the electrode connected thereto being essentially zero.

2. The surge arrester of claim 1 in which:
(a) said one electrode comprises (i) a body having a generally circular periphery and (ii) a pair of lugs projecting from said circular periphery and respectively constituting the source terminal and the load terminal of said one electrode, and
(b) said disk structure has a generally circular periphery which is substantially aligned with the circular periphery of the body of said one electrode.

3. The surge arrester of claim 1 in which:
(a) said one electrode comprises (i) a body having a substantially rectangular periphery and (ii) a pair of lugs projecting from opposite sides of said periphery and respectively constituting the source terminal and the load terminal of said one electrode, and
(b) said disk structure has a substantially rectangular periphery which is substantially aligned with the rectangular periphery of said one electrode body.

4. The surge arrester of claim 1 in which:
(a) said one electrode comprises (i) a body portion and (ii) two lugs projecting from said body portion and respectively constituting the source terminal and the load terminal of said electrode, and
(b) said disk structure has a periphery which is substantially aligned with the periphery of the body portion of said one electrode.

5. The surge arrester of claim 1 in which:
(a) each of said electrodes comprises (i) a body portion and (ii) two lugs projecting from said body portion and respectively constituting the source terminal and the load terminal of said electrode,
(b) the body portion of each of said electrodes is in the form of a plate located in a predetermined plane, and
(c) the lugs of each electrode are located in the same plane as the body portion of the electrode.

6. The surge arrester of claim 1 in which:
(a) each of said electrodes comprises (i) a body portion and (ii) two lugs projecting from said body portion and respectively constituting the source terminal and the load terminal of said electrode,
(b) the body portion of each of said electrodes is in the form of a plate located in a predetermined plane, and
(c) the lug of each electrode constituting the source terminal is located in the same plane as the body portion of said electrode.

7. The surge arrester of claim 1 in which each of said electrodes comprises a body portion and two lugs projecting from said body portion and respectively constituting the source terminal and the load terminal of said electrode.

8. A surge arrester for protecting against high-energy and very fast surges imposed upon a line comprising two conductors, each connected between a source and a load, the surges being capable of rising to thousands of amperes in less than 100 nanoseconds, said surge arrester comprising:
(a) a first conductive electrode for connection in series with one of said conductors between said source and said load,
(b) a second conductive electrode for connection in series with the other of said conductors between said source and said load,
(c) metal oxide varistor disk structure having external surfaces at opposite ends of its thickness,
(d) thin metallic coatings respectively coating said external surfaces,
(e) means for mounting said metal oxide varistor disk structure between said two electrodes with one of said electrodes contacting one of said metallic coatings and the other electrode contacting the other of said metallic coatings, and further characterized by:
(f) said first electrode having a source terminal and a load terminal at generally opposite sides of said first electrode for connection to said one conductor in such a manner that a load current in said one conductor normally flowing between said source and said load flows through said first electrode via a path that extends in series through said source terminal and said load terminal substantially parallel to and closely adjacent one of said external surfaces,
(g) said second electrode having a source terminal and a load terminal at generally opposite sides of said second electrode for connection to said other conductor in such a manner that said load current in returning through said other conductor normally flows between said load and said source through said second electrode via a path that extends in series through said load terminal and said source terminal substantially parallel to and closely adjacent the other of said external surfaces,
(h) the source terminals of said two electrodes being generally aligned with each other about the periphery of said disk structure,
(i) the distance between the source terminal and the load terminal of each electrode being at least three times the thickness of said disk structure,
(j) the inductance of said two electrodes between the source and load terminals of each electrode coacting with the resistance of said disk structure when the disk structure is rendered conductive by a current surge entering through the source terminal of one electrode to form a low-pass L/R filter that substantially reduces the voltage appearing at the load terminal of said one electrode in comparison to that appearing at the source terminal during passage of said surge,
(k) at least one of said electrodes being sufficiently narrow transversely of the normal current path therethrough that the electrode provides no conductive bypass between the source terminal and the load terminal thereof that is located outside the periphery of said varistor disk structure in the region of said electrode,
(l) the effective length of any lead between each line conductor and the electrode connected thereto being essentially zero.

9. The surge arrester of claim 8 in which:
(a) each of said electrodes comprises (i) a body portion and (ii) two lugs projecting from said body portion and respectively constituting the source terminal and the load terminal of said electrode,
(b) the body portion of each of said electrode is in the form of a plate located in a predetermined plane, and (c) the lugs of each electrode are located in the same plane as the body portion of said electrode.

10. The surge arrester of claim 8 in which:
(a) each of said electrodes comprises (i) a body portion and (ii) two lugs projecting from said body portion and respectively constituting the source terminal and the load terminal of said electrode,
(b) the body portion of each of said electrodes is in the form of a plate located in a predetermined plane, and
(c) the lug of each electrode constituting the source terminal is located in the same plane as the body portion of said electrode.

* * * * *